(12) United States Patent
Lee et al.

(10) Patent No.: US 9,000,091 B2
(45) Date of Patent: Apr. 7, 2015

(54) PREPARATION OF POLYOLEFIN-BASED ADHESIVES

(75) Inventors: Chun D. Lee, Cincinnati, OH (US); Maged G. Botros, West Chester, OH (US); Charles S. Holland, Springboro, OH (US)

(73) Assignee: Equistar Chemicals, LP, Houston, TX (US)

( * ) Notice: Subject to any disclaimer, the term of this patent is extended or adjusted under 35 U.S.C. 154(b) by 359 days.

(21) Appl. No.: 12/319,486

(22) Filed: Jan. 8, 2009

(65) Prior Publication Data

US 2010/0174036 A1 Jul. 8, 2010

(51) Int. Cl.
*C08L 23/08* (2006.01)
*C08L 51/04* (2006.01)
*B29C 47/00* (2006.01)
*B32B 7/12* (2006.01)
*B32B 27/32* (2006.01)
*C09J 123/08* (2006.01)
*C08L 23/16* (2006.01)
*C08L 51/00* (2006.01)

(52) U.S. Cl.
CPC . *B32B 7/12* (2013.01); *B32B 27/32* (2013.01); *C08L 23/0807* (2013.01); *C09J 123/0807* (2013.01); *C09J 123/0815* (2013.01); *C08L 23/16* (2013.01); *C08L 51/00* (2013.01)

(58) Field of Classification Search
USPC ..................................... 525/74, 84
See application file for complete search history.

(56) References Cited

U.S. PATENT DOCUMENTS

| | | | |
|---|---|---|---|
| 4,487,885 A | 12/1984 | Adur et al. | |
| 6,713,585 B1 | 3/2004 | Mavridis et al. | |
| 6,716,928 B2 | 4/2004 | Botros | |
| 6,855,432 B1 | 2/2005 | Hojabr et al. | |
| 6,894,115 B2 * | 5/2005 | Botros | 525/101 |
| 2001/0004336 A1 * | 6/2001 | Eggen et al. | 366/81 |
| 2003/0230824 A1 * | 12/2003 | Furgiuele et al. | 264/176.1 |
| 2006/0076705 A1 | 4/2006 | Fowler et al. | |
| 2007/0054142 A1 | 3/2007 | Lee et al. | |
| 2007/0167569 A1 | 7/2007 | Botros | |
| 2008/0032148 A1 * | 2/2008 | Lee et al. | 428/523 |

FOREIGN PATENT DOCUMENTS

| | | |
|---|---|---|
| CN | 1378579 A | 11/2002 |
| WO | WO 2007/030172 | 3/2007 |
| WO | WO 2008/018949 | 2/2008 |

* cited by examiner

Primary Examiner — Jeffrey Mullis

(57) ABSTRACT

Disclosed is a method for preparing polyolefin-based adhesives. In the method, a maleated polyolefin is blended, in sequence, with a polyolefin elastomer and then with a linear low density polyethylene. The polyolefin-based adhesive made according to the method of the invention shows improved clarity and adhesion in multilayer polyolefin films.

9 Claims, No Drawings

PREPARATION OF POLYOLEFIN-BASED ADHESIVES

FIELD OF THE INVENTION

The present invention relates to the preparation of polyolefin-based adhesives. More particularly, the invention relates to a method for preparing polyolefin-based adhesives that have improved clarity and adhesion in multilayer polyolefin films.

BACKGROUND OF THE INVENTION

Polyolefin-based adhesives are useful for bonding polyolefins with polar materials such as nylon, ethylene vinyl alcohol copolymer (EVOH), and metals. Polyolefin-based adhesives commonly comprise maleic anhydride-grafted polyolefins. The grafting is usually performed by visbreaking, with or without free radical initiator, the polyolefin in the presence of maleic anhydride to cause formation of free radicals on the polymer chains that react with maleic anhydride. The grafted polyolefin is typically let-down with additional polyolefin resins to a desired concentration and to provide a polyolefin-based adhesive. See U.S. Pat. No. 4,487,885.

The grafted polyolefin can be let-down by a variety of polyolefin resins, including high density polyethylene (HDPE), low density polyethylene (LDPE), linear low density polyethylene (LLDPE), polypropylene, and ethylene-vinyl acetate copolymers. High performance adhesives also utilize a polyolefin elastomer as a let-down resin. In the known processes, the elastomer is premixed with other let-down resins and the mixture is then blended with the grafted polyolefin. Alternatively, the grafted polyolefin, elastomer and other let-down resins are simultaneously blended.

There is a need for an improved process for producing polyolefin-based adhesives that give better clarity and adhesion in multilayer polyolefin film application.

SUMMARY OF THE INVENTION

The invention is a process for making a polyolefin-based adhesive. The adhesive comprises a maleated polyolefin, a polyolefin elastomer, and a linear low density polyethylene. The process comprises blending the maleated polyolefin, in sequence, with the polyolefin elastomer and then with the linear low density polyethylene. The adhesive made according to the process of the invention has good clarity and good adhesion in multilayer polyolefin films.

DETAILED DESCRIPTION OF THE INVENTION

The process of the invention comprises blending, in sequence, a maleated polyolefin with a polyolefin elastomer and then with a linear low density polyethylene (LLDPE). Suitable maleated polyolefin for use in the invention include those known to the industry. Examples include maleated high density polyethylene (HDPE), low density polyethylene (LDPE), linear low density polyethylene (LLDPE), propylene homopolymer, propylene random copolymer, propylene impact copolymer, the like, and mixtures thereof. Methods for maleating polyolefin are known. For instance, U.S. Pat. No. 6,716,928, the teachings of which are incorporated herein by reference, teaches maleating a propylene impact copolymer.

Preferably, the maleated polyolefin is a maleated HDPE. Suitable HDPE for making maleated HDPE includes ethylene homopolymers and copolymers of ethylene and α-olefins. Suitable alpha-olefins include 1-butene, 1-hexene, and 1-octene, the like, and mixtures thereof. Preferably, the HDPE comprises less than about 5 wt % of the α-olefins. The density of HDPE is preferably from about 0.93 to about 0.97 g/cm$^3$ and more preferably from about 0.95 to about 0.965 g/cm$^3$. Preferably, the maleated HDPE contains from about 0.05 wt % to about 5 wt % of grafted maleic anhydride. More preferably, the maleated HDPE contains from about 0.5 wt % to about 2.5 wt % of grafted maleic anhydride.

Suitable polyolefin elastomers for use in the process of the invention include ethylene-propylene rubber (EPR), ethylene-propylene-diene monomer rubber (EPDM), the like, and mixtures thereof. As used herein, the term "elastomer" refers to products having rubber-like properties and little or no crystallinity. Preferably, the polyolefin elastomers contain from about 10 wt % up to about 80 wt % ethylene monomeric units. More preferably, the polyolefin elastomers contain from 10 wt % to 70 wt % ethylene monomeric units. Illustrative polyolefin elastomers which are commercially available include Lanxess Corporation's BUNA® EP T 2070 (22 Mooney ML(1+4) 125° C., 68% ethylene, and 32% propylene); BUNA EP T 2370 (16 Mooney, 3% ethylidene norbornene, 72% ethylene, and 25% propylene); BUNA EP T 2460 (21 Mooney, 4% ethylidene norbornene, 62% ethylene, and 34% propylene); ExxonMobil Chemical's VISTALON® 707 (72% ethylene, 28% propylene, and 22.5 Mooney); VISTALON® 722 (72% ethylene, 28% propylene, and 16 Mooney); and VISTALON 828 (60% ethylene, 40% propylene, and 51 Mooney). Suitable EP elastomers available from commercial sources also include ExxonMobil Chemical's VISTAMAXX® series of elastomers, particularly VISTAMAXX grades 6100, 1100, and 3000. These materials are ethylene-propylene elastomers of 16, 15, and 11 wt % ethylene content, respectively, and a Tg of about −20 to −30° C. VISTAMAXX 6100, 1100, and 3000, respectively, have a melt flow rate of 3, 4, and 7 g/10 min at 230° C.; a density of 0.858, 0.862, and 0.871 g/cm$^3$; and a 200 g Vicat softening point of 48, 47, and 64° C. Other suitable EP elastomers include Dow Chemical's VERSIFY® elastomers, particularly grades DP3200.01, DP3300.01, and DP3400.01, which have an ethylene content of 9, 12, and 15 wt %, respectively. These grades have a melt flow rate of 8 g/10 min at 230° C.; a density of 0.876, 0.866, and 0.858 g/cm$^3$, respectively; a Vicat softening point of 60, 29, and <20° C., respectively; and a Tg of −25, −28, and −31° C., respectively.

Suitable LLDPE for use in the process of the invention include copolymers of ethylene and α-olefins. Alpha-olefins include 1-butene, 1-hexene, and 1-octene, the like, and mixtures thereof. The density of LLDPE is preferably within the range of about 0.865 to about 0.925 g/cm$^3$. LLDPE is commercially available, for instance GS707® and GS710® LLDPE from Equistar Chemicals, LP. Particularly preferred LLDPE includes those which have a shear modifiable network structure. LLDPE having a shear modifiable network structure is taught, for instance, by U.S. Pat. No. 6,713,585, the teachings of which are incorporated herein by reference. Suitable LLDPE can be produced by a Ziegler, single-site, or any other olefin polymerization catalysts.

Preferably, the polyolefin-based adhesives made according to the process of the invention comprises from about 2 wt % to about 30 wt % of maleated polyolefin, from about 1 wt % to about 30 wt % of polyolefin elastomer, and up to about 97 wt % of LLDPE. More preferably, the polyolefin-based adhesives made according to the process of the invention comprises from about 5 wt % to about 15 wt % of maleated polyolefin, from about 2 wt % to about 10 wt % of polyolefin elastomer, and up to about 93 wt % of LLDPE. The polyolefin-based adhesive optionally comprises additives such as antioxidants, UV-absorbents, flow agents, the like, and mixtures thereof. The polyolefin-based adhesive optionally comprises adhesion promoters. Useful promoters include organic bases, carboxylic acids and organometallic compounds including organic titanates and complexes or carboxylates of lead, cobalt, iron, nickel, zinc and tin such as dibutyltin dilaurate, dioctyltin maleate, dibutyltin diacetate, dibutyltin dioctoate, stannous acetate, stannous octoate, lead naphthenate, zinc caprylate, cobalt naphthenate and the like, and mixtures thereof.

The maleated polyolefin is first blended with the polyolefin elastomer; and the resultant mixture is then blended with LLDPE. The blending can be performed by any suitable methods. Preferably, the blending is performed thermally at a temperature above the melting points of the components. For instance, the blending can be performed in a Banbury mixer or in an extruder. Extrusion is more preferred for commercial production. Twin-screw extruders, such as those marketed by Coperion under the designations ZSK-53 and ZSK-83, ZSK-90, and ZSK-92 are particularly preferred. We surprisingly found that by blending the maleated polyolefin, in sequence, with the polyolefin elastomer and then with LLDPE, the polyolefin-based adhesive produced shows significantly improved clarity and adhesion compared with those made by blending the maleated polyolefin with a premixed polyolefin elastomer and LLDPE.

Preferably, the process of the invention integrates grafting maleic anhydride onto a polyolefin, blending the maleated polyolefin with a polyolefin elastomer, and then blending the resulted mixture with LLDPE. More preferably, all these three steps are performed in a multistage extruder. Multistage extruders are known. For instance, U.S. Pat. Appl. Pub. No. 2006/0076705, the teachings of which are incorporated herein by reference, teaches a multistage extruder assembly.

In the multistage extrusion process, the grafting reaction is preferably in the presence of a free radical initiator. Suitable free radical initiator includes 1,1-bis(tert-butylperoxy)cyclohexane; n-butyl-4,4-bis(tert-butylperoxyvalerate); 1,1-bis(tert-butylperoxy)-3,3,5-trimethylcyclohexane; 2,2-bis(tert-butylperoxy)butane; dicumylperoxide; tert-butylcumylperoxide; α,α'-bis(tert-b utylperoxypreoxyisopropyl)benzene; di-tert-butyl peroxide; 2,5-dimethyl-2,5-di(tert-butylperoxy)hexane; the like, and mixtures thereof. The free radical initiator is preferably added to the extruder after maleic anhydride and the polyolefin have been thoroughly mixed. After the grafting reaction is essentially completed, the maleated polyolefin moves to the second stage of the extrusion where a polyolefin elastomer is fed to the extruder and blended with the maleated polyolefin. After the maleated polyolefin and elastomer are thoroughly mixed, the mixture moves to the third stage of the extrusion where LLDPE is fed to the extruder and blended therewith.

Preferably, the process of the invention is integrated with the LLDPE production. This is a so-called "in-line" process. In this process, a maleated polyolefin is blended with a polyolefin elastomer and the resultant mixture is then blended with an LLDPE reactor powder from the LLDPE polymerization line before pelletization.

The invention also includes a multilayer polyolefin film which comprises a tie-adhesive layer made according to the process of the invention. By multilayer, we mean that the film have at least two more layers besides the tie-adhesive layer. The tie-adhesive layer bonds the other layers together. One example of multilayer film is a five-layer film which has the structure of HDPE/tie-layer/EVOH/tie-layer/HDPE. Ethylene-vinyl alcohol copolymer (EVOH) layer is employed as a barrier to oxygen. Another example of multilayer film is a seven-layer film which has the structure of LLDPE/HDPE/tie-layer/EVOH/tie-layer/HDPE/LLDPE. Suitable LLDPE and HDPE for use in the multilayer films are the same as discussed above. The multilayer film of the invention can be made by a variety of processes. The multilayer film can be made by co-extrusion, coating, and other laminating processes. The film can be made by casting, blown film, or double-bubble orientation processes. Blown film processes include high-stalk and in-pocket processes. In a high-stalk process, the extrudate exits the annular opening in the die in the form of a tubular "stalk" that is inflated a distance (usually the length of the stalk) from the extrusion die. For an in-pocket blown process, the tube is inflated as the tube exits the extrusion die. After the tube is flattened and cooled, it can be slit to form a film.

The following examples merely illustrate the invention. Those skilled in the art will recognize many variations that are within the spirit of the invention and scope of the claims.

EXAMPLE 1

Maleated HDPE (PMG 2300, product of Equistar Chemicals, LP, 10 parts by weight) is blended with ethylene-propylene rubber (EPR V722, product of ExxonMobil Chemical, 5 parts by weight) in a ZSK-30 twin-screw extruder at 220° C. and 230 RPM. The resulted mixture is then blended with LLDPE (GA602040, product of Equistar Chemicals, LP, 85 parts by weight) under the same conditions to yield an adhesive resin.

A five-layer film, in which the above adhesive resin is used as a tie-adhesive layer, is made on a Killion extruder with the structure of HDPE/tie-adhesive/EVOH/tie-adhesive/HDPE. HDPE is Alathon® M6210, product of Equistar Chemicals, LP, which has an $MI_2$ of 0.95 dg/min and density of 0.958 g/cm$^3$. EVOH is Soarnol® DC3203 FB grade, product of Nippon Gohsei Kagaku K.K., Japan. The layer distribution is 43%, 3%, 8%, 3%, and 43%, respectively. Film samples are tested for adhesion according to ASTM D1876. The force required to separate the film apart in a T-Peel configuration at 25.4 mm (10")/min is measured using Instron® tensile tester. The average adhesion of five specimens is recorded as the peel strength in lb/in. For a 3-mil film, the adhesion is 1.7 lb/in; for a 5-mil film, the adhesion is 3.1 lb/in.

COMPARATIVE EXAMPLE 2

The general procedure of Example 1 is followed, but the adhesive resin is made by blending the maleated HDPE with a pre-mixture of EPR and LLDPE. For a 3-mil film, the adhesion is 1.4 lb/in; for a 5-mil film, the adhesion is 2.6.

EXAMPLE 3

A five-layer film, in which the adhesive resin made in Example 1 is used as a tie-adhesive layer, is made on a Killion extruder with the structure of EVA/tie-adhesive/EVOH/tie-adhesive/EVA. EVA (ethylene-vinyl acetate copolymer) is UE624, a product of Equistar Chemicals, LP, which has an $MI_2$ of 2 dg/min and VA content of 28%. EVOH is Soarnol® DC3203 FB grade, product of Nippon Gohsei Kagaku K.K., Japan. The layer distribution is 36%, 7%, 14%, 7% and 36%, respectively. Film samples are tested for clarity using Narrow Angle Scattering (NAS) measurements. The NAS measurements are performed using a Zebedee CL-100 clarity meter. The film samples are cut into 10 cm×10 cm and adhered to the test unit in the front of the light source by air suction. The average clarity of seven specimens is recorded as the average clarity. For a 7-mil film, the average clarity is 26.

COMPARATIVE EXAMPLE 4

The general procedure of Example 3 is followed, but the adhesive resin made in Comparative Example 2 is used. For a 7-mil film, the average clarity is 24.

We claim:

1. A process for producing a polyolefin-based adhesive comprising:
   (a) blending a maleated polyolefin with a polyolefin elastomer to form a maleated polyolefin/polyolefin elastomer composition; and
   (b) blending the maleated polyolefin/polyolefin elastomer composition with a linear low density polyethylene to form the polyolefin-based adhesive,
   wherein the polyolefin-based adhesive comprises:
   (i) 2 to 30 wt. %, based upon the total weight of the polyolefin-based adhesive, of the maleated polyolefin;
   (ii) 1 to 30 wt. %, based upon the total weight of the polyolefin-based adhesive, of the polyolefin elastomer; and
   (iii) 40 to 97 wt. %, based upon the total weight of the polyolefin-based adhesive, of the linear low density polyethylene, wherein the linear low density polyethylene has a shear modifiable network.

2. The process of claim 1, wherein the maleated polyolefin is a maleated high density polyethylene.

3. The process of claim 2, wherein the maleated high density polyethylene contains from 0.05 wt. % to 5 wt. %, based upon the total weight of the maleated high density polyethylene, of a grafted maleic anhydride.

4. The process of claim 3, wherein the maleated high density polyethylene contains 0.5 wt. % to 2.5 wt. %, based upon the total weight of the maleated high density polyethylene, of the grafted maleic anhydride.

5. The process of claim 1, wherein the polyolefin elastomer is an ethylenepropylene rubber.

6. The process of claim 1, wherein the polyolefin-based adhesive comprises:
   (i) 5 to 15 wt. %, based upon the total weight of the polyolefin-based adhesive, of the maleated polyolefin;
   (ii) 2 to 10 wt. %, based upon the total weight of the polyolefin-based adhesive, of the polyolefin elastomer; and
   (iii) 75 to 93 wt. %, based upon the total weight of the polyolefin-based adhesive, of the linear low density polyethylene.

7. An extrusion process for preparing a polyolefin-based adhesive comprising:
   (a) grafting maleic anhydride onto a polyethylene to produce a maleated polyethylene;
   (b) blending the maleated polyethylene with a polyolefin elastomer to form a maleated polyethylene/polyolefin elastomer blend; and
   (c) blending a linear low density polyethylene with the maleated polyethylene/polyolefin elastomer blend to form the polyolefin-based adhesive,
   wherein the polyolefin-based adhesive comprises:
   (i) 2 to 30 wt. %, based upon the total weight of the polyolefin-based adhesive, of the maleated polyethylene;
   (ii) 1 to 30 wt. %, based upon the total weight of the polyolefin-based adhesive, of the polyolefin elastomer; and
   (iii) 40 to 97 wt. %, based upon the total weight of the polyolefin-based adhesive, of the linear low density polyethylene, wherein the linear low density polyethylene has a shear modifiable network.

8. The process of claim 7, wherein the polyethylene is a high density polyethylene.

9. The process of claim 7, wherein the polyolefin elastomer is an ethylenepropylene rubber.

* * * * *